United States Patent [19]

Johnsen

[11] Patent Number: 4,836,494
[45] Date of Patent: Jun. 6, 1989

[54] DEVICE FOR MOUNTING A RAIL OR THE LIKE ON A SURFACE

[76] Inventor: Anders Johnsen, Alderbäcken 35, S-781 93 Borlänge, Sweden

[21] Appl. No.: 133,128
[22] PCT Filed: Apr. 8, 1987
[86] PCT No.: PCT/SE87/00174
  § 371 Date: Dec. 4, 1987
  § 102(e) Date: Dec. 4, 1987
[87] PCT Pub. No.: WO87/06311
  PCT Pub. Date: Oct. 22, 1987

[30] Foreign Application Priority Data

Apr. 8, 1986 [SE] Sweden ............................ 86015559

[51] Int. Cl.$^4$ ............................................ F16M 13/00
[52] U.S. Cl. ...................................... 248/669; 125/14; 248/201; 248/222.4; 248/295.1
[58] Field of Search ................. 248/669, 297.2, 297.3, 248/297.5, 297.1, 201, 205.1, 295.1, 222.4; 211/162; 125/14

[56] References Cited

U.S. PATENT DOCUMENTS 3,250,584  5/1966  Tassell .................... 248/297.2 X
3,462,110  6/1967  Cheslock ................ 248/295.1 X
3,652,048  3/1972  Hartman ................ 248/297.2 X
3,763,845  10/1973  Hiestand et al. .............. 125/14

FOREIGN PATENT DOCUMENTS 132363    3/1933   Austria ...................... 248/295.1
2225893  12/1973   Fed. Rep. of Germany .
2659818  10/1977   Fed. Rep. of Germany ... 248/295.1

Primary Examiner—J. Franklin Foss
Assistant Examiner—David L. Talbott
Attorney, Agent, or Firm—Notaro & Michalos P.C.

[57] ABSTRACT

A device for mounting a rail (1) on a surface which particularly is non-horizontal, comprises at least one mounting element (11) adapted to be secured on said surface, at least one connecting element, which is displaceably received in a guide extending along the rail and an engaging arrangement having means for mutual clamping connection of the connecting element and the mounting element in order to connect the rail with the mounting element. The engaging arrangement comprises means (23, 24) for provisionally coupling the connecting element and the mounting element by means of a hooking movement of the connecting element having a movement component substantially parallel to said surface.

16 Claims, 4 Drawing Sheets

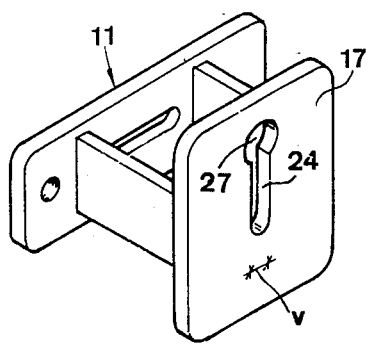
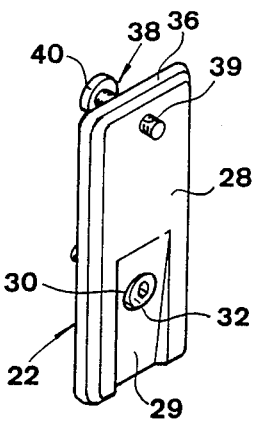
FIG 3      FIG 4
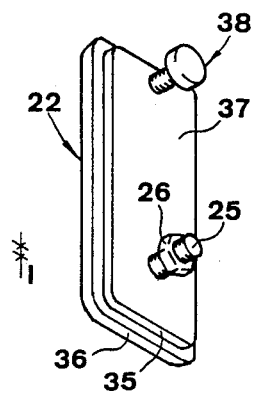
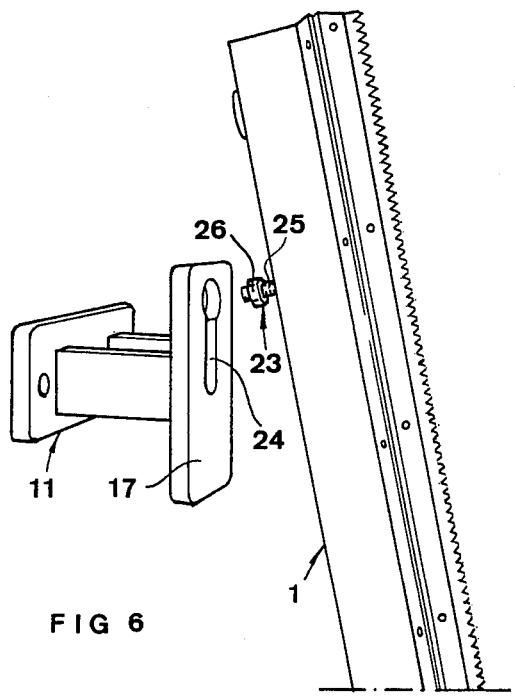
FIG 5      FIG 6

DEVICE FOR MOUNTING A RAIL OR THE LIKE ON A SURFACE

FIELD OF THE INVENTION AND PRIOR ART

This invention concerns a device according to the preamble of the appended claim 1. The rail in question is preferably intended to serve for guiding a carriage driveable along the rail and carrying a machining tool, especially a saw tool, driven by a motor also arranged on the carriage. The machining and particularly the sawing are intended to be carried out on that surface, on which the rail is mounted. The surface may in the practice consist of a building wall of concrete or another arbitrary material.

A device according to the preamble of claim 1 is described in U.S. Pat. No. 3,763,845. The guide does there consist of a slot extending straight through the rail, while the connecting element can be brought to engage into the guide in the transversal direction of the rail by one portion. The means for clamping connection of the connecting element and the mounting element consists of a screw, which with clearance passes through a bore in the connecting element and comes into engagement with a threaded bore in the mounting element. When the rail is to be mounted on a wall surface generally two mounting elements are first of all fixed upon this, whereupon the rail is mounted to the mounting elements by means of two connecting elements and screws belonging thereto. When the rail is to be mounted on a first of the mounting elements the operator has to correctly locate the rail generally having an important weight with respect to the mounting element and during holding the rail in the right vertical position the operator shall also try to introduce the screw protruding through the connecting element into the threaded bore in the mounting element. In order to achieve this the operator must try to hold the rail with one of his hands and manipulate the screw with the other. Once the operator has succeeded to introduce the screw into the orifice of the threaded bore he has to try to turn this screw by hand in order to get the same into engagement with the thread of the threaded bore. Using a turning tool during this initial phase would probably make it even more difficult for the operator to correctly locate the threaded bore. Once the operator has succeeded in obtaining an engagement between the screw and the threaded bore he has to, during continued holding of the rail in the desired vertical position, carry out further turning of the screw, which then may be done by means of a tool. The screwing is suitably carried out until the rail is secured in the desired position. Subsequently the rail may by means of an additional connecting element and a screw be fixed to the second mounting element, and this operation is a little bit easier to carry out, since the rail at that time is vertically located, but nevertheless it may be troublesome to introduce the screw into correct thread engagement with the threaded bore. Before the thread engagement between a screw and the threaded bore belonging thereto in the mounting element has been achieved the connecting element is free to fall from the rail so that the operator accordingly has to hold the connecting element and the screw by his one hand all the time. It will be apparent that the mounting work discussed is very hard to carry-out from the load as well as the manipulating point of view. It may sometimes be possible to get some help in the mounting work by letting the lower end of the rail rest upon some underlayer or support, for instance a floor, but this is certainly not always possible, especially not if the rail shall be mounted on a wall surface in horizontal or another non-vertical position. The mounting work gets particularly burdensome when the rails are very long and by that heavy and when the rail is loaded by the machining equipment and/or the carriage therefor.

SUMMARY OF THE INVENTION

The object of the invention is to reduce the drawbacks discussed above concerning the mounting work and thus to provide a device making it considerably easier to mount the rail on the mounting elements.

According to the invention this object is obtained by providing the device with the characteristics appearing from the appended claims. Thus, owing to the fact that the device has at least one locking means operable independently of said engaging arrangement for locking the connecting element in a desired position along the guide of the rail, the operator is able to in a preparatory phase secure the connecting element in an approximately correct position relative to the rail by means of the locking means, so that he during the coupling of the connecting element and the mounting element accordingly does not need to by hand hold the connecting element in the intended position with respect to the rail. Furthermore, thanks to the fact that the engaging arrangement comprises means of the connecting element and of the mounting element for initially provisionally coupling the connecting element and the mounting element secured to the surface by means of a hooking movement of the connecting element having a movement component substantially parallel to said surface, the need of simultaneously holding the rail and the connecting element and in addition turning the screw is eliminated; the operator has instead only to carry out one single comparatively easily accomplishable hooking operation. Moreover, since the coupling means are designed to prevent movement of the connecting element in the direction downwardly along the surface and in the direction away from the surface in the coupled position, a provisional holding of the rail until finally clamping is carried out is obtained.

BRIEF DESCRIPTION OF THE DRAWINGS

With reference to the appended drawings, below follows a specific description of an embodiment of the invention cited by way of example. In the drawings:

FIG. 3 is a perspective view illustrating a mounting element alone, FIG. 4 is a perspective view of a connecting element alone, FIG. 5 is a view of the connecting element from the opposite side, FIG. 6 is a partial view illustrating the intended hooking operation, and FIG. 7 sectional view illustrating the mounted state of the device.

DETAILED DESCRIPTION OF A PREFERRED EMBODIMENT

Figure 1:
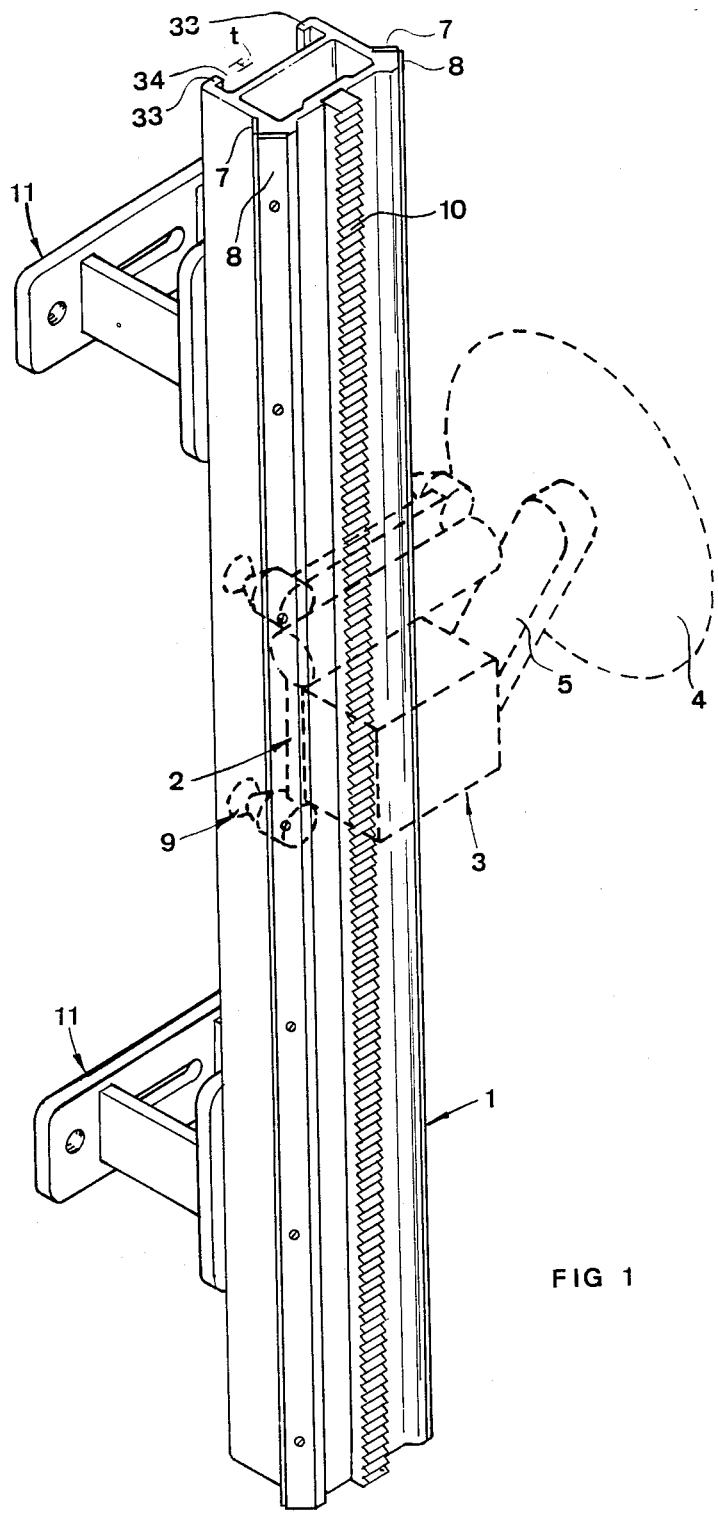
FIG. 1 is a perspective view of the device in the mounted state, a machining unit being illustrated schematically and by dashed lines.

In FIG. 1 the rail 1 is illustrated, which is imagined to be secured to a vertical wall surface by means of two mounting elements 11. A schematically illustrated carriage 2 is moveable to and fro along the rail. This carriage carries or supports a machining unit 3, in the example a sawing machine. The sawing machine comprises a sawing tool 4 and an arm 5 carrying this tool. The arm 5 is pivotably journalled in bearings in a plane substantially parallel to the longitudinal direction of the rail 1 and substantially perpendicular to that surface 7 (FIG. 6) upon which the mounting element 11 is fixed. The sawing tool 4 is rotatable about an axis parallel to the pivot axis of the arm 5 connected to the extremity of the arm 5. By pivoting the arm 5 a sawing tool 4 can be brought towards and away from the surface 6 and accordingly carry out a sawing cut in this. In displacing the carriage 2 along the rail 1 a longitudinal sawing cut parallel to a rail 1 is obtained. The arm 5 does preferably possess a 360° pivotability.

The rail 1 has two sets of guide surfaces 7, 8, the sets being mutually separated and located at the side edges of the rail. The surfaces 7, 8 in each set make an angle with each other, in the example approximately 90° and they are both making an angle of substantially 45° with the plane of the wall surface 6. The surfaces 7, 8 of each set converge towards each other in the direction away from a point half-way between the two sets. The guide surfaces 7, 8 are intended to co-operate with double conical rolls 9, which are arranged on the carriage 2 in a way known per se. The rail 1 has in addition to that a cog railway 10 centrally arranged on the rail, said cog railway co-operating with a gear arranged on the carriage 2, the rotation of said gear giving rise to the displacement of the carriage 2.

Provided that nothing else is said it will in the following be assumed that the rail 1 is intended to get mounted completely vertically. As next appears from FIG. 2 each mounting element 11 has a base plate 12, which in its middle region has a horizontal elongated slit 13 and threaded bores 14 on both sides thereof with respect to the horizontal direction. As it will be closer described hereinafter the slit 13 is intended to co-operate with a securing means 15 (FIG. 7), e.g. an expansion-shell bolt or a bolt which extends completely through the wall in question, while the bores 14 are intended to receive levelling screws so as to enable adjusting of the plane of the base plate 12 with respect to the wall surface. Two plates 16 secured on each side of the slit, mutually parallel and vertically directed connect the base plate 12 with a mounting plate 17.

Figure 2:
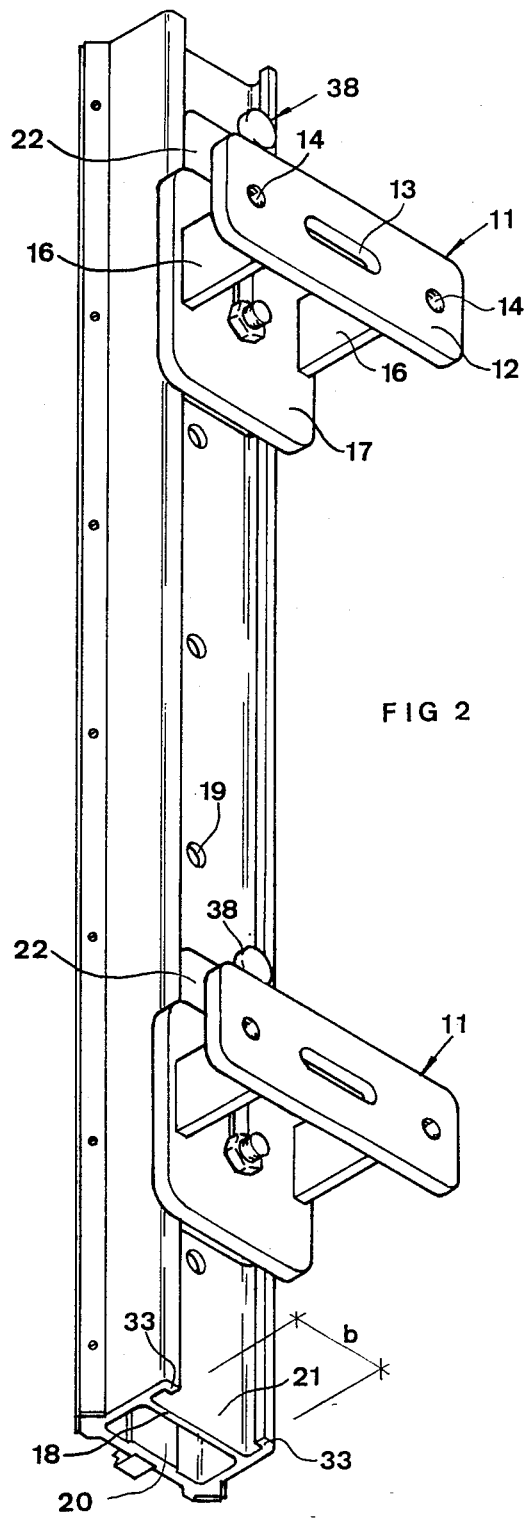
FIG. 2 is a view similar to FIG. 1 viewed from the opposite side.

As appears from FIG. 2 the rail 1 has a wall portion 18 in which bores 19 are arranged in order to permit access to an internal cavity 20 in the rail for introducing and tightening, respectively, screws designated for tightening of the cog railway 10. The wall portion 18 serves also for forming a guide 21 in the form of a track extending along the entire length of the rail and intended to receive connecting elements 22 as visible in FIG 2 and 4. These connecting elements are displaceably moveable along the guide 21.

The device has an arrangement for connecting the connecting elements 22 to the mounting plates 17 of the mounting elements. This arrangement comprises means 23 and 24 (see for example FIG. 6) of the connecting element 22 and of the mounting plate 17 of the mounting element for provisionally coupling these elements by means of a hooking movement of the connecting element and the rail attached thereto having a movement component substantially parallel to the wall surface 6, the coupling means 23, 24 being designed to prevent movement of the connecting element in the direction downwardly along the wall surface and in the direction away from the wall surface.

Coupling means comprise on one hand a projection 23 (see also FIG. 7) arranged on the connecting element and having a neck portion 25 and an enlarged head portion 26 at a distance from the base of the projection, and on the other a slot 24 arranged in the mounting plate 17 of the mounting element, being vertically directed and having a width being smaller than the width of the head portion 26 in the direction transversal to the slot 24 but greater than the width of neck portion 25 in the same direction. At its upper end the slot 24 is associated to an introduction opening 27, through which the neck portion 25 may be introduced into the slot 24, so that the head portion 26 will be located behind material portions of the mounting plate 17 defining a slot 24. In the example the introduction opening 27 is designed to receive the projection 23 in a direction substantially perpendicular to the longitudinal direction of the slot 24 and the plane of the plate 17, which means that the introduction opening 27 must have such a width that the head portion 26 may be introduced therethrough. Accordingly, the slot 24 has smaller width than the width of the introduction opening 27 in the direction transversal to the slot. However, as an alternative it would be possible to let the slot 24 extend with the same width as far as to the upper edge of the mounting plate 17, in which case no enlarged introduction opening 27 is required.

Figure 7:
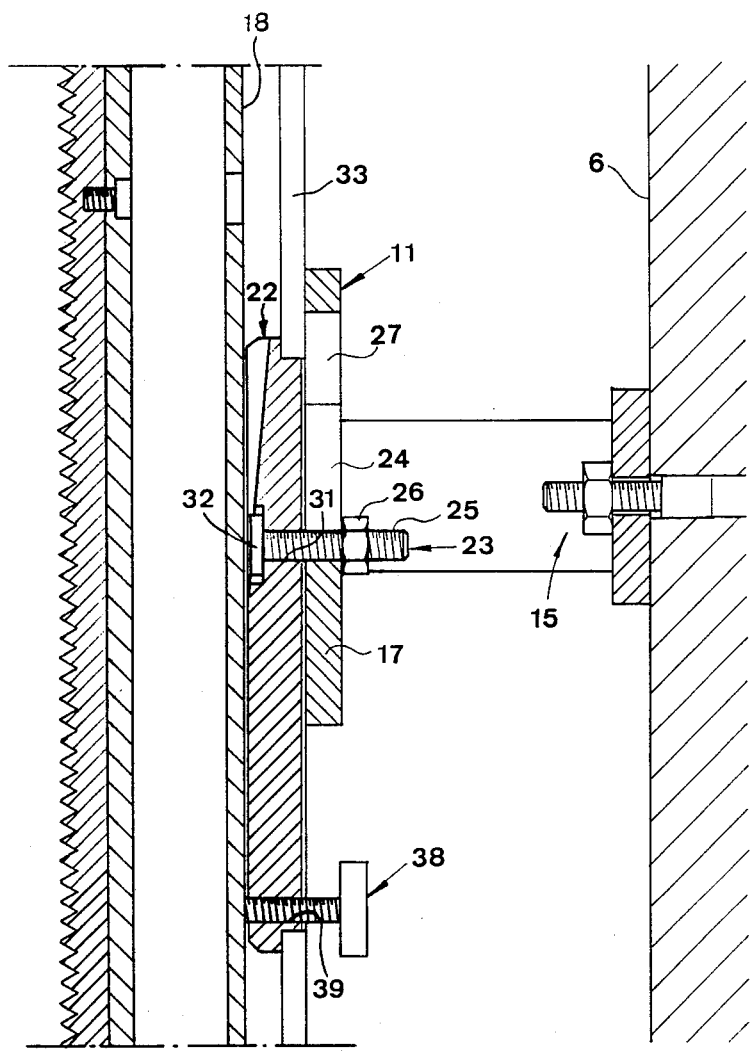

The head portion 26 of the projection 23 is as it appears from FIG. 7 tightenable against the rear side of the portions of the plate 17 defining the slot 24 so as to clamp the connecting element 22 against the plate 17. The neck portion 25 of the projection consists of a threaded shaft while the head portion 26 consists of a nut. This nut 26 is tightenable from the rear side of the plate 17 by means of a suitable wrench. Accordingly, the means 23, 24 do not only serve for provisionally coupling, but also for permanent tightening of the connecting element 22 and the mounting element 11. In FIG. 4 that side of the connecting element 22 which is intended to face to the rail 1 is indicated by 28. In this side a chamfering 29 as well as a circular counter-sinking 30 are carried out. A threaded bore 31 is located centrally in this counter-sinking 30, said bore extending straight through the connecting element 22 perpendicularly to the surface 28. As appears from FIG. 7 this threaded bore 31 receives a screw, the head of which 32 is located in the counter-sinking 30 inside the surface 28 and the threaded shaft of which is for example the one denoted by 25 in FIG. 5. This screw is intended to be closely tightened with respect to the connecting element 22 in order to permanently hang together therewith.

The connecting element 22 and the mounting plate 17 are arranged to clamp portions 33 of the rail between portions of their own, at the same time as the guide 21 of of the guide 21, to be removed out of this in all directions substantially perpendicular to the longitudinal direction of the rail and the guide. Accordingly, the connecting element can only be introduced into the guide 21 from the two ends of the rail, or alternatively one end of the rail if the other would have any stop means, which however as a rule should be avoided.

As appears from FIG. 1 and 2 the guiding track 21 of the rail has a substantially T-shaped cross section having the web of the T emerging at 34 into that side of the rail 1 which is intended to face to the mounting element 11. As appears from FIG. 5 the connecting element 22 has also a T-shaped cross section, the web of which is denoted by 35 and the rib of which is denoted by 36, and fits into the T-shaped track 21 of the rail. The width of the rib 36 exceeds the width b (see FIG. 2) of the web portion of the track 21. The threaded shaft 25 protrudes from the web 35 of the connecting element 22 and when the connecting element 22 and the mounting plate 17 are clamped against each other the surface 37 formed by the extremity of the web 35 is located at a distance from the front side of the mounting plate 17 at the same time as the portions 33 of the rail defining the web of the T-shaped track between each other are pressed into contact with the front surface of the mounting plate 17. Accordingly, the extension 1 of the web from the rib 36 (FIG. 5) is smaller than the thickness t of the portions 33, which consist of in cross section L-shaped prolongations of the outer side walls of the rail 1, the wall portion 18 extending between said side walls.

It appears from especially FIG. 2 and 7 that the device for each connecting element has a locking means 38 operable independently of the engaging arrangement 23, 24 for locking the connecting element 22 in a desired position along the guide 21 of the rail. A locking means 38 does in the example consist of a locking screw having a threaded shaft in engagement with a threaded bore 39 in the connecting element and acting through one of its ends upon the bottom of the track 21 of the rail formed by the wall portion 18 so as to affect the connecting element 22 in the direction away from this bottom and to clamping abutment through the rib 36 against the inner sides of the rail portions 33. The other end of this screw 38 has an operating head 40, which for easy operating by hand may have the form of a knob.

DESCRIPTION OF THE WAY OF FUNCTION OF THE DEVICE

When the rail 1 is to be mounted in a vertical position on a wall first of all appropriate bores for the securing means 15 (FIG. 7) are drilled. For one rail 1 generally at least two mounting elements 11 are used. These mounting elements 11 are secured to the wall surface 6 by the screws, and in doing so the levelling screws engaging into the bores 14 are preferably so far screwed that the base plate 12 will be located at a distance from the wall surface 6. After that the levelling screws 14 are slightly unscrewed so that the base plates 12 are a little bit loose. Then the two connecting elements are located more or less accurately in the positions intended therefor in the track 21, whereupon the connecting elements 22 are locked by the screws 38. Then the operator attend to that the nuts 26 are located comparatively close to the extremity of the screws 25. After that the nut 26 of one of the coupling means generally the upper one as indicated in FIG. 5, may easily by appropriate movement of the rail be introduced through the introduction opening 27 of the mounting plate 17, so that the screw 25 enters into the slot 24 and the nut 26 will be located on the rear side of the plate 17. After this initial hooking operation the rail is safely carried by the upper mounting element and after that the nut 26 and the screw 25 of the lower connecting element may, possibly after a certain adjustment of the position of the connecting elements along the track 21, be introduced through the introduction opening 27 of the lower mounting element in a corresponding way, whereupon the connecting element 22 is moved downwardly so that the screw 25 is located upon the bottom of the slot 24 in the lower mounting element. After that the locking screw 38 of the lower connecting element 22 is possibly tightened. As an alternative it is of course possible to in advance exactly adjust the two connecting elements 22 into the correct positions along the rail so that the nuts 26 and screws 25 of both of the connecting elements come into engagement with the mounting plates 17 of the mounting elements. After that the nuts 26 are tightened so that the rail 1 is stably clamped against the mounting plates 17. Owing to the fact that the two mounting elements 11 as described earlier then are a little bit loose they can be adapted to the rail 1. Finally the lateral position of the rail 1 is adjusted by possible lateral displacement of the mounting elements 11 thanks to the slits 13, whereupon the screws engaging into the bores 14 of the mounting elements 11 are tightened so that they will bear against the wall surface 6 and accordingly force the mounting elements outwardly from the wall surface during the fixing of the latter, said forcing outwardly being counter-acted by the securing means 15. The carriage 2 and the unit 3 may now be connected to the rail and the sawing work or the like may be carried out. The carriage 2 and the unit 3 may of course also be placed on the rail 1 during the mounting operation, and a further alternative is to construct the carriage 2 and the unit 3 to be separate so that only the carriage 2 itself is placed on the rail during the mounting operation while the machining unit 3 is applied to the carriage when the rail is in its place.

The rail 1 may naturally be placed on the wall surface 6 in inclined positions in a corresponding way, while the mounting elements 11 are obliquely mounted to a corresponding extent on the wall surface.

Of course it is also possible to mount the rail 1 in a horizontal position on a vertical wall surface. It may be advantageous to modify the mounting elements 11 for such a mounting, so that the slits 13 allowing adjustment will extend parallel to the slot 24 and not as illustrated in the drawings perpendicularly thereto; the case is that it is desirable that the slots 24 are so located that their ends in association with the introduction opening 27 always are on a higher level than their lower ends supporting the threaded shafts 25, since the security will then be greater while concerning the slits 13 it will be desirable that they allow adjustment of the position of the mounting elements perpendicular to the intended sawing cut. However, theoretically it is certainly possible also to dispose the slots horizontally.

The device provides a very good mounting stability at the same time as the rail is easily and with a very small risk of accident adjustable in the longitudinal direction. If such an adjustment is desired the nuts 26 are loosened so that the clamping action ends, but the provisional suspension function remains. After that the screws 38 are loosened and the rail may now be longitudinally displaced. When the desired position is obtained a temporary locking may be achieved by one or more of the screws 38, whereupon finally tightening can be carried out by the nuts 26.

POSSIBLE MODIFICATIONS OF THE INVENTION

Above it has been described how the projection 23 is arranged on the connecting element 22 while the slot 24 is arranged in the mounting element 11. Naturally the opposite would also be possible. Furthermore, it should be observed that it will also be possible to arrange first means for provisionally coupling the connecting element 22 and the mounting element 11 and second means separated from these first means for causing the final mutual clamping of these elements. Although the device gives rise to particular advantages in mounting rails on vertical or inclined surfaces, it is of course also well adapted for use for mounting rails on horizontal surfaces.

It should be observed that the connecting element 22 in FIG. 7 for exemplifying purpose is disposed with the means 38 below the means 23, since such a disposition also is possible.

Two rails 1 may be connected with one end against the other straight in front of a mounting element 11 while the connecting element protrudes partly into the track 21 of both of the rails.

I claim:

1. In a saw assembly comprising a rail (1), a carriage (2) movable therealong and a sawing machine (3) to be secured to said carriage for movement therewith; a device for mounting the rail on a surface (6) which is non-horizontal, said device comprising at least one mounting element (11) adapted to be secured on said surface, said rail (1) having a guide (21) extending along the rail, at least one connecting element (22) which is displaceably received in said guide (21) and an engaging arrangement having means (23,24) for mutual clamping connection of the connecting element and the mounting element to order to connect the rail (1) to the mounting element secured on said surface, wherein the engaging arrangement comprises means (23,24) of the connecting element (22) and of the mounting element (11) for provisionally coupling the connecting element and the mounting element secured to the surface (6) by means of a hooking movement of the connecting element having a movement component substantially parallel to said surface (6), the coupling means being designed to prevent movement of the connecting element in the direction downwardly along the surface and in the direction away from the surface in the coupled position, and the device comprises at least one locking means (38) operable independently of the engaging arrangement (23,24) for locking the connecting element (22) relative to the rail in a desired position along the guide (21) of the rail (1).

2. A device according to claim 1 characterized in that the coupling means comprise a projection (23) arranged on one of the connecting element (22) and the mounting element 11 and having a neck portion (25) and an enlarged head portion (26) at a distance from the base of the projection, and a slot (24) arranged in the other of the mounting element (11) and the connecting element (22) and having a width being smaller than the head portion (26) in the direction transversal to the slot but greater than the width of the neck portion in the same direction, said slot (24) being associated to an introduction opening (27), through which the neck portion (25) may be introduced into the slot, so that the head portion (26) will be located behind material portions defining the slot.

3. A device according to claim 2, characterized in that the introduction opening (27) is designed to receive the projection (23) in a direction substantially perpendicular to the longitudinal direction of the slot.

4. A device according to claim 2, characterized in that the head portion (26) of the projection is tightenable against the rear side of the material portions defining the slot (24) so as to clamp the connecting and mounting elements (22,11) toward each other.

5. A device according to claim 4, characterized in that the neck portion (25) of the projection (23) consists of a threaded shaft while the head portion (26) consists of a nut.

6. A device according to claim 5, characterized in that the slot (24) is arranged in a plate member (17) of the mounting element while the projection (23) is arranged on the connecting element (22) and that the nut forming the head portion (26) is tightenable from that side of the plate member which is intended to face to said surface (6).

7. A device according to claim 1, characterized in that the means (23, 24) for mutual clamping connection of the connecting and mounting elements form at the same time means for provisionally coupling said elements.

8. A device according to claim 1, characterized in that the connecting element (22) and the mounting element (11) are arranged to camp portions of the rail between portions of their own and that the guide (21) of the rail and the connecting element (22) are so designed that the latter is prevented along at least the main part of the extension of the guide to be removed out of the guide in all directions substantially perpendicular to the longitudinal direction of the rail and the guide.

9. A device according to claim 8, characterized in that the coupling means comprise a projection (23) arranged on one of the connecting elements (22) and the mounting element (11) and having a neck portion (25) and an enlarged head potion (26) at a distance from the base of the projection, and a slot (24) arranged in the other of the mounting element (11) and the connecting element (22) and having a width being smaller than the head portion (26) in the direction transversely to the slot, but greater than the width of the neck portion in the same direction, said slot (24) being associated with an introduction opening (27), through which the neck portion (25) may be introduced into the slot, so that the head portion (26) will be located behind the material portions defining the slot, and in that the guide (21) of the rail consists of a track with a substantially T-shaped cross section having the web of the T emerging into one side of the rail, that also the connecting element (22) has a T-shaped cross section and fits into the T-shaped track of the rail, that the projection (23) protrudes from the web (35) of the T formed by the connecting element and that, when the connecting element and the mounting element are clamped toward each other, the surface (37) formed by the extremity of the web of the T-shaped connecting element is located at a distance from the mounting element at the same time as the portions (33) of the rail defining the web of the T-shaped track (21) between each other are pressed into contact with the mounting element.

10. A device according to claim 9, characterized in that the locking means (38) consists of a locking screw arranged on the connecting element, and in that the locking screw (38) engages a threaded bore (39) in the connecting element and through one of its ends acts upon the bottom of the T-shaped track of the rail so as to affect the connecting element in the direction away from this bottom and by that clamp the connecting element.

11. A device according to claim 1, characterized in that the locking means (38) consists of a locking screw arranged on the connecting element.

12. A device according to claim 1, wherein said locking means (38) is located in a position to be accessible for operation to respectively lock and release the connecting element relative to the rail, also when the connecting element is provisionally coupled to the mounting element.

13. A saw assembly comprising:
 an elongated rail having an outer machine supporting side and an inner wall facing side, said rail having a T-shaped guide track extending the length of said wall facing side, said rail including clamping portions on opposite sides of said track defining an open web there between;
 a T-shaped connecting element slidable in and along said track, said connecting element having a rib slidable between said clamping portions and a web slidable in the web of said track;
 a carriage engaged for movement along said machine supporting side of said rail;
 a machine unit mounted to said carriage for movement with said carriage along said rail;
 a mounting element having a base plate fixable to a non-horizontal surface and a mounting plate spaced from said base plate;
 one of said connecting element and mounting plate including a slot therein having an introduction opening and extending substantially parallel to the surface to which said base plate is to be fixed;
 a neck portion connected to the other of said connecting element and mounting plate and extending through the slot;
 a head portion engaged with said neck portion for clamping said connecting element to said mounting plate, said head portion being of a size to be introducible into said introduction opening and being larger than said slot, said neck portion being moveable along said slot; and
 locking means connected to said connecting element and engagable with said rail for locking said connecting element at a selected position along said rail, said locking means acting independently of the clamping of said head portion.

14. A saw assembly according to claim 13, wherein said head is threaded to said neck, said locking means comprising a locking screw threaded to said connecting element and rotatable to engage against said rail.

15. A saw assembly according to claim 14, including at least one connecting plate connected between said base plate and said mounting plate at a location spaced away from said locking means for free access of said locking means, said mounting plate including a mounting slit and a threaded bore.

16. A saw assembly according to claim 15, wherein said neck portion is fixed to and extends from said connecting element, said slot being defined in said mounting plate, said introduction opening comprising an enlargement of said slot for receiving said head portion.

* * * * *